United States Patent
Coffin et al.

(10) Patent No.: US 9,586,809 B2
(45) Date of Patent: Mar. 7, 2017

(54) CONTROLLING MATERIAL FLEXIBILITY THROUGH USE OF VARIED THICKNESS, GEOMETRY, WAVES, AND RESIN FORMULATION

(71) Applicants: Edmund Coffin, Ruckersville, VA (US); Stanley Pq Yavoroski, New Hope, PA (US)

(72) Inventors: Edmund Coffin, Ruckersville, VA (US); Stanley Pq Yavoroski, New Hope, PA (US)

( * ) Notice: Subject to any disclaimer, the term of this patent is extended or adjusted under 35 U.S.C. 154(b) by 216 days.

(21) Appl. No.: 14/217,086

(22) Filed: Mar. 17, 2014

(65) Prior Publication Data

US 2014/0311105 A1    Oct. 23, 2014

Related U.S. Application Data

(60) Provisional application No. 61/791,628, filed on Mar. 15, 2013.

(51) Int. Cl.
*B68C 1/02*    (2006.01)
*B29C 65/72*   (2006.01)

(52) U.S. Cl.
CPC ............ *B68C 1/025* (2013.01); *B29C 65/72* (2013.01)

(58) Field of Classification Search
CPC .. B68C 1/025; B68C 1/00; B68C 1/02; B68C 1/04; B29C 65/72; B62J 1/002; B62J 1/007
See application file for complete search history.

(56) References Cited

U.S. PATENT DOCUMENTS

| | | | | |
|---|---|---|---|---|
| 709,904 | A * | 9/1902 | Hastings et al. | B68C 1/025 54/44.7 |
| 3,997,214 | A * | 12/1976 | Jacobs | B62J 1/18 297/202 |
| 5,823,618 | A * | 10/1998 | Fox | B62J 1/005 297/195.1 |
| 6,254,180 | B1 * | 7/2001 | Nelson | B62J 1/002 297/201 |
| 7,249,800 | B2 * | 7/2007 | Jalkanen | A47C 7/022 297/195.11 |
| 7,661,756 | B2 * | 2/2010 | Chen | B62J 1/007 297/195.1 |
| 2013/0214568 | A1 * | 8/2013 | Mueller | B62J 1/007 297/195.1 |

FOREIGN PATENT DOCUMENTS

| | | | | |
|---|---|---|---|---|
| EP | 2119667 A1 * | 11/2009 | | B68C 1/02 |
| GB | 717270 A * | 10/1954 | | B68C 1/025 |

* cited by examiner

*Primary Examiner* — Kathleen Alker
(74) *Attorney, Agent, or Firm* — Sheldon H. Parker, Esq.

(57) ABSTRACT

An saddletree with controlled flexing is disclosed using multiple pairs of wave depressions. One group of wave depressions extends from the edge of the tree toward the central channel. Other waves are on the pommel and within the central channel. The pommel wave positioned along the centerline of the tree contains an ellipse and a pair of slots on either side to control flex. The interior of the central channel is scalloped along a portion of the periphery and a recess is cut into the edge of the pommel. An engineered rail and secondary rail are formed into the underside. The underside of the saddletree is covered with bidirectional carbon weave that extends from the underside to the top surface to overlap on a portion of the top surface.

25 Claims, 8 Drawing Sheets

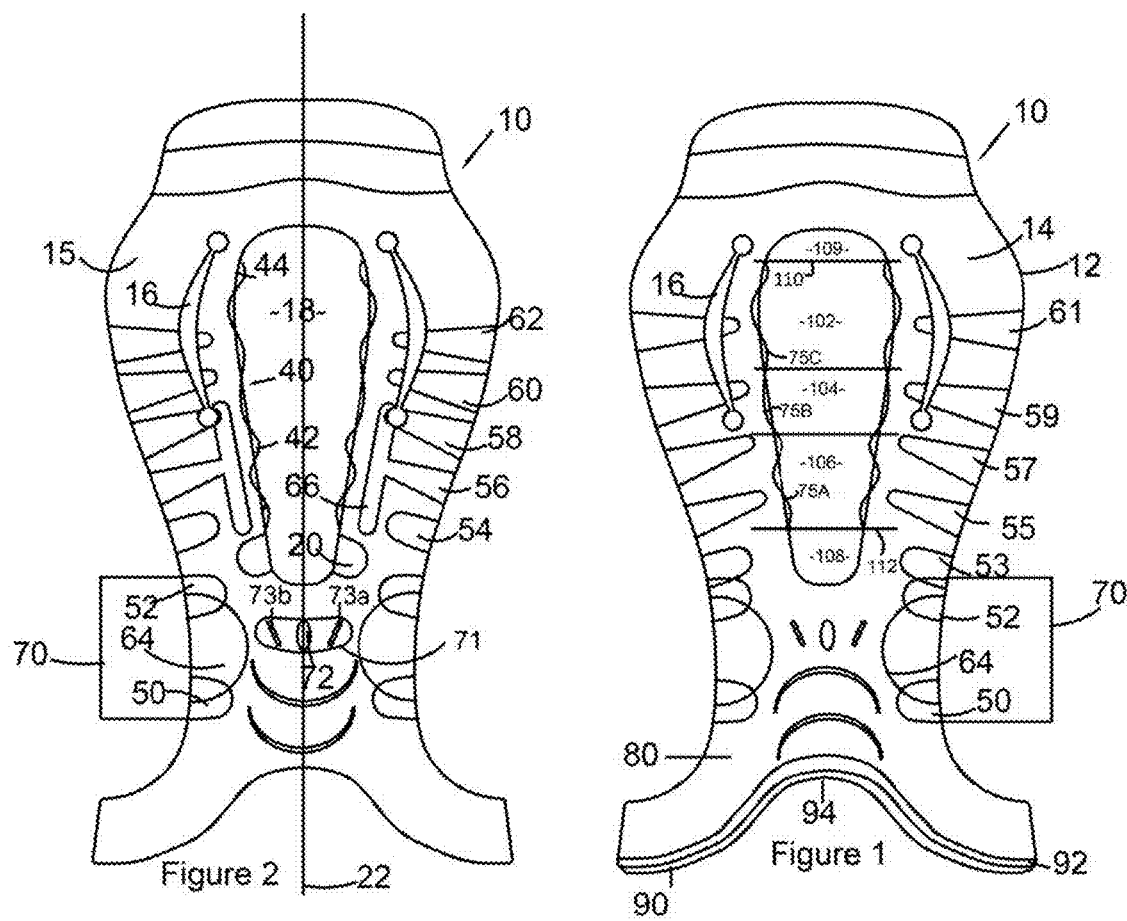

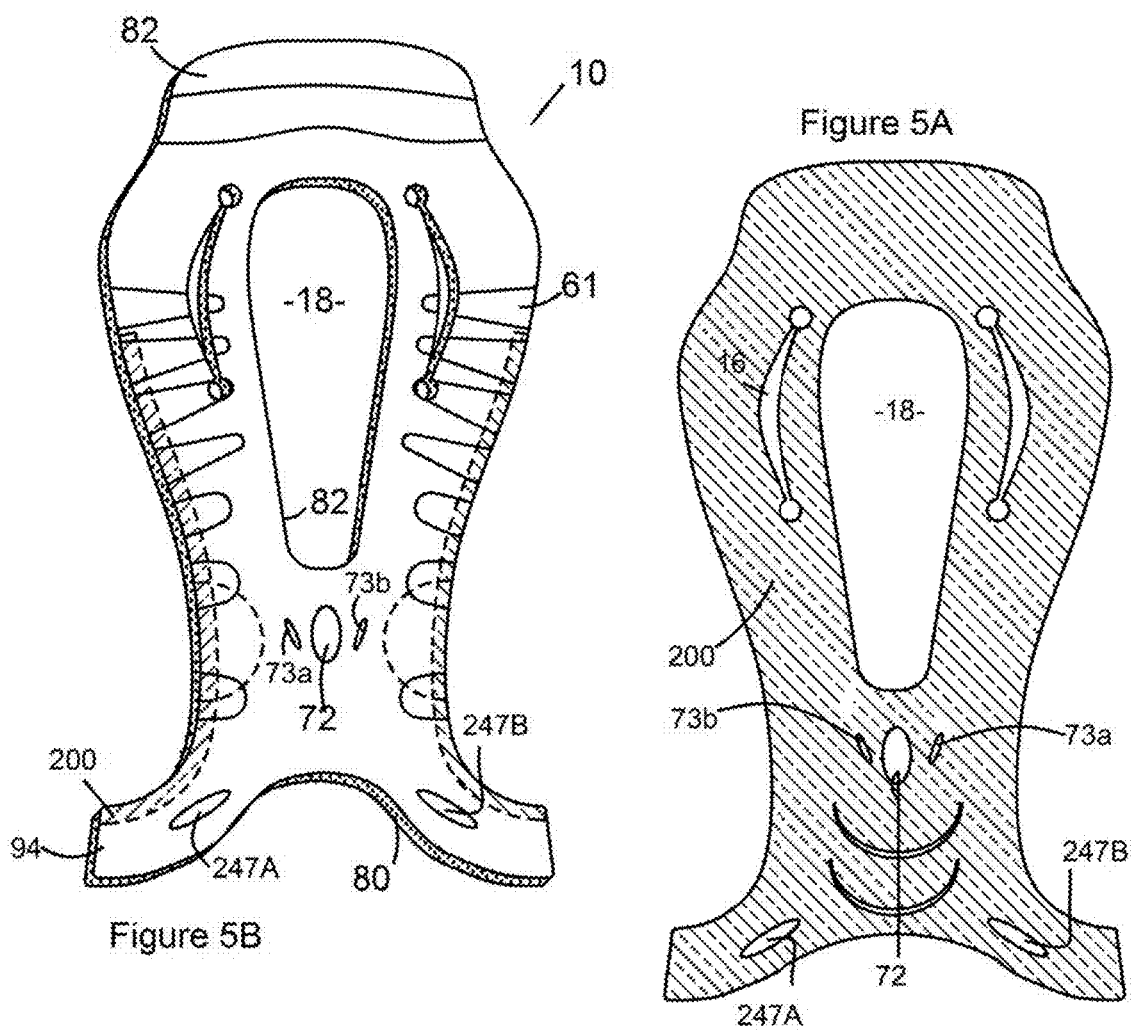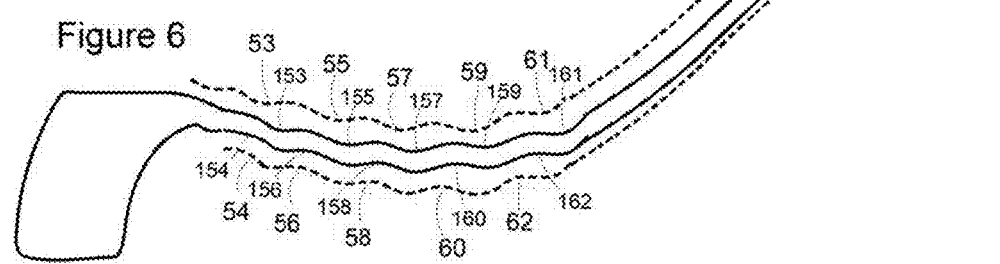

CONTROLLING MATERIAL FLEXIBILITY THROUGH USE OF VARIED THICKNESS, GEOMETRY, WAVES, AND RESIN FORMULATION

FIELD OF THE INVENTION

This invention relates to methods to control the flexibility of a material by varying the thickness of the support material; the physical geometry of the support material; the formation of waves in the support material, and through the formulation of the adhesive resins. This invention also incorporates the application of these technologies into the design and production of saddletrees.

BRIEF DESCRIPTION OF THE PRIOR ART

Few changes have been made over the centuries that saddles have been in use. The English saddletree has kept approximately the same shape and has been made primarily of wood for hundreds of years until after WWII. At that time spring steel attachments were incorporated into the design to give the saddletree improved flexibility without negatively impacting structural integrity. Until the recent use of plastics, and other manmade materials, little had been done to reduce the weight. The latest major advancement in saddletrees was disclosed in U.S. Pat. No. 6,044,630, in which a saddle having improved balance and fit is disclosed and U.S. Pat. No. 7,231,889 in which a saddle further improving the comfort and contact between a rider and horse is disclosed; the '630 and '889 patents being incorporated herein as though recited in full.

The traditional saddletree is comprised of thin layers of wood, with glue in between, that are molded into the desired form. Metal reinforcement is used along the sides of the saddle as well as the gullet. The life span of the glued wood saddletrees with metal reinforcement is limited as eventually use stretches the width of the saddletree and increases the possibility of severe torquing. Prior art methods of compensating for the breakdown of the traditional saddletree have been to add metal reinforcements, which subsequently add weight. Many saddles eventually fail from the affects of constant use and, at times, considerable torque. Strength, however, remained an issue. Saddles must provide some flexibility; however excessive torque and force management have been a problem with prior art saddletrees of wood construction. A professional quality saddle is an expensive investment and expected to last many years. A cracked, weakened or broken saddletree, however, immediately makes the saddle unusable.

In U.S. Pat. No. 5,101,614 a hollow saddletree formed of rotationally molded cross-linked polyethylene was disclosed. The hollow saddletree is of unitary, one piece construction and formed of cross-linked polyethylene by a rotational molding process with all of the structural elements of the saddle being of substantially equal thickness. Because the saddletree it is hollow, light and sufficiently flexible, it conforms to the contours of the back of the horse. A saddletree of this form may exhibit significant flexibility, however it is lacking the structural integrity to obtain optimal performance. Fiberglass reinforced plastics have also been used to reduce the cost of saddle manufacturing. Saddletrees of this nature are described in U.S. Pat. No. 3,293,828 to Hessler incorporated herein by reference. The problem with fiberglass-reinforced saddletrees is that they are too rigid resulting in hot spots and micro fractures which cause a break down of the structural integrity. In addition, saddletrees formed of fiber reinforced plastics+ are too stiff and do not conform to the horse's back. In consequence, they cause abrasion to the sides of the horse, to the discomfort of the horse. Saddles formed of foam-filled fiber reinforced plastics have also been described in U.S. Pat. No. 3,258,894 to Hoaglin. In this construction, two sections are molded from fiber reinforced plastic, combined together and the interior filled with urethane foam. Injected molded saddles have also been tried and described in U.S. Pat. Nos. 3,712,024 and 3,780,494. High cost of molding, difficulty of quality control and lack of versatility have been the problems with injected molded saddles.

SUMMARY OF THE INVENTION

An equine saddletree with controlled flexing is disclosed. The body comprises a top surface, an underside, a cantle, a pommel, a center channel, sidebars between the pommel and cantle, and multiple pairs of sets of offset wave depressions. Each of the sets of wave depressions set has a predetermined number of depressions along each of said sidebar edges from, proximate the pommel toward the cantle. Each of the wave depressions has a counterpart on the opposing side of said saddletree to form undulations between top and under surfaces to enable limited stretch along the sidebar edges. A first pair of sets is proximate the pommel, with each pair comprising a central wave and opposing proximal wave and distal wave. The proximal and distal waves are depressions from the top surface, said central wave a depression from the underside. The second of the sets of pairs are half ovals and the third of the sets are cones.

The pommel has a gullet and points, the gullet and points having a proximal edge and the points having a distal edge. A carbon strip covers the top and underside surfaces of the pommel. Receiving holes on either side of the gullet receive a carbon strip from the top surface of the first point through a first receiving hole, along the underside of the gullet, through a second receiving hole and along the top surface of the second point.

A pair of single inner waves, having a half oval configuration, are located on the underside. The end line is at the center channel proximate the first of pair of wave sets. A pommel wave, a pair of half ovals with adjacent end lines and at an angle to a centerline of the saddletree is located on the underside proximate the pommel. An ellipse, extending from the top surface to the underside is centered on said centerline within the pommel wave. Slots extend from the top surface to the underside are angled from the centerline on either side of the ellipse.

The center channel has a peripheral edge and is divided into five sections, a first section being proximate said pommel and having a smooth edge, said second section, third section and fourth section having scallops along their edges and a fifth section having a smooth edge. Scallops in the third section having a greater length and less depth than scallops in the second and fourth sections.

The underside of the saddletree is covered with bidirectional carbon weave at a 45 degrees angle, plus or minus 10%, from the saddletree centerline. The bidirectional weave extends from the underside to the top surface along said distal edge of said points and said sidebar edges to the first, second and third sections to form an overlap on top surface of about ⅜ inch. The weave extends from the underside along the peripheral edge of the center channel flush with the top surface.

The saddletree has an engineered rail etched, or otherwise formed, into the underside at the center channel periphery at said sections two, three, four and five. A secondary rail is etched, or otherwise formed, into the underside approximately parallel to and spaced from the center channel. The secondary rail is etched in at least a portion of section two and three.

A recess, having a width and a length, is cut in the proximal edge of the pommel, with the width of the recess being greater at the proximal edge of the gullet than at the proximal edge of points.

BRIEF DESCRIPTION OF THE DRAWINGS

The advantages of the instant disclosure will become snore apparent when read with the specification and the drawings, wherein:

FIG. 1 is a plan view of the top surface of the saddletree having waves, in accordance with the disclosed invention;

FIG. 2 is a plan view of the underside of the saddletree having waves in accordance with the disclosed invention;

FIG. 5A is a view of the underside of the saddletree with the carbon sheet added, in accordance with the disclosed invention;

FIG. 5B is a view of the top of the saddletree with the carbon sheet added to the underside and wrapped around the edges in accordance with the disclosed invention;

FIG. 6 is a side view of the saddletree illustrating the compression and expansion enabled by the waves in accordance with the disclosed invention;

DETAILED DESCRIPTION OF THE INVENTION

Definitions

For the purposes as employed herein, the term "bi-directional carbon weave" shall mean carbon fiber, or equivalent materials having the same qualities and meeting the criteria set forth herein, woven into sheet material having a warp and weft.

For the purposes as employed herein, the term "carbon strip" shall mean unidirectional carbon fiber, or other materials having the same qualities and meeting the criteria set forth herein.

For the purposes as employed herein, the term "composite" shall mean a material made from more than one substance, preferably from the line of acrylic-polyvinyl chloride materials, or the equivalent, for example Kydex®.

Figure 4:
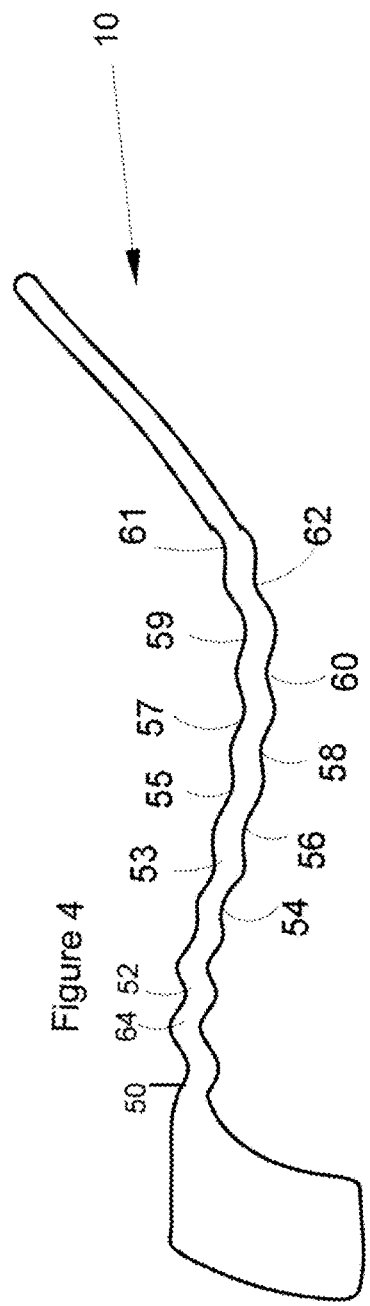
FIG. 4 is a side view of the saddletree showing the waves, in accordance with the disclosed invention.

For the purposes as employed herein, the terms "cone" and "conical" shall mean a conical depression that tapers to and end region from a base at an edge of the saddletree. The end region can be circular or curved and has a diameter less that the diameter of the base. The conical depression generates a wave form as seen in FIGS. 4 and 6.

For the purposes as employed herein, the term "engineered rail" shall mean to the structure that enables the flexing of the saddletree to be controlled. The engineered rail is composed of the flex slots. S cross section and rim.

For the purposes as employed herein, the term "gullet" shall mean the channel at the pommel, which provides clearance for the horse's withers so the saddle does not place pressure on the withers.

For the purposes as employed herein, the term "half oval" shall mean a wave having two spaced parallel sides, a curve connecting the two sides at one end and an end line at the curvature of an edge of the saddletree and/or other half oval at the opposing end, as illustrated in FIGS. 1, 2, 5B, 7, 8, 10 and 14.

For the purposes as employed herein, the term "optimum performance" shall mean the specific design flexion of the saddletree without deformation.

For the purposes as employed herein, the term "points" shall mean the area of the pommel that extends from the gullet along the front portion of the saddle.

For the purposes as employed herein, the term "pommel" shall mean the front portion of the saddle consisting of a gullet and points.

For the purposes as employed herein, the term "saddletree" shall mean the frame of a saddle onto which all additional materials are secured and which forms the basic manner in which the saddle contacts the horse and rider.

For the purposes as employed herein, the term "scallop", "scallops" and "scalloped" shall mean an edge marked with semicircles forming an undulation and having a length and a depth.

For the purposes as employed herein, the term "side bars" shall mean the portion of the saddletree connecting the pommel and the cantle.

For the purposes as employed herein, the term "torque" shall mean the measure of a force's tendency to produce torsion and rotation about an axis, equal to the vector product of the radius vector from the axis of rotation to the point of application of the force and the force vector.

For the purposes as employed herein, the term "torsion" shall mean the stress or deformation caused when one end of an object is twisted in one direction and the other end is held motionless or rotated to a lesser degree, or twisted in the opposite direction.

For the purposes as employed herein, the terms "wave" and "depression" shall interchangeable mean the depression of a surface and/or an undulating depression of a surface spaced between adjacent waves.

A traditional saddletree is comprised of thin layers of laminated wood, which are molded into the desired form. Metal reinforcement is used along the sides of the saddle as well as the gullet. The life span of the glued wood saddletrees with metal reinforcement is limited as eventually use stretches the form of the saddletree and increases the possibility of severe torquing. Prior art methods of compensating for the breakdown of the traditional saddletree have been to add metal reinforcements, which subsequently add weight. Many saddles eventually fail from the effects of constant use and, at times, considerable torque.

With the advent of the use of synthetics to replace the traditional wood saddletree, the cost was lowered, however the fit and strength of the saddletree needed addressing. The foregoing objects are disclosed in U.S. Pat. Nos. 7,231,889, 6,044,630, 6,691,498, and pending application Ser. No. 12/726,793 filed Mar. 18, 2010, all of which are incorporated herein as though recited in full.

This invention relates to methods to control the flexibility of a material by varying the thickness of the support material; the physical geometry of the support material; the formation of waves in the support material, and the formulation of the adhesive resins.

The invention incorporates the application of these technologies into the design and production of saddletree and bicycle seats.

To provide the required directional flexibility while maintaining strength, a-saddletree is manufactured from a composite material, as described in the heretofore noted patents, and reinforced portions of the underside and at least a portion of the top surface of the saddletree with carbon. The carbon is then coated with at least two resins having different flexibility characteristics. While the carbon and resin provide strength, they reduce the directional flexibility. To provide the controlled, directional flexibility, while maintaining the needed strength, waves, or undulations, are formed along the edge of the saddletree and are strategically placed within the pommel area.

While the above combination was initially developed for use with saddletrees, it was also found that the combination provides these characteristics to other items, such as bicycle seats, manufactured from composite where strength and flexibility are advantageous.

For English saddletrees, the tolerances from the optimal dimensioning and examples listed hereinafter can be varied dependent upon the saddle size. It would be obvious to one skilled in the art that less stress will be placed upon a 15 inch saddle ridden by a child than an 18.5 (18½) inch saddle ridden by a large man. Using the criteria set forth herein the degree of variation from the examples will be obvious to those versed in the art.

For skateboards, boat hulls and other structures requiring directed flexibility and strength the tolerances will vary depending upon the end use.

The disclosed technology can be used on any style of saddletree with the change in dimensions, spacing of waves and resin rigidity, using the technology taught herein, being obvious to those skilled in the art.

FIG. 1 illustrates the top surface of the saddletree 10 and FIG. 2 the underside, both of which are described in conjunction with one another. These figures are shown prior to the addition of the carbon to clearly illustrate the novel features and their placement on the saddletree. As both edges of the saddletree are mirror images, only one edge of each the top and bottom will be described.

The saddletree 10 is formed using the "forming tools" created by a CNC machine using the data points provide by the computer modeling as disclosed in the patents referenced and incorporated herein. The center channel 18 remains, as with prior saddletrees, as it is necessary to provide for the clearance for the horse's spine as well as rider comfort and saddletree flexibility. The channel 18 does not, however, extend as close to the edge of the pommel 80 as prior art saddles and ends approximately 4 to 6 inches from the edge of the pommel 80. A portion of the interior edge 42 of the channel 18 is slightly scalloped, a configuration that is created by cutting into the interior edge 42 to a depth of approximately 0.03 (3/100) of an inch. The scallops can be as much as 0.06 (6/100) of an inch or as little as 0.01 (1/100) of an inch, however closer to 0.03 (3/100) of an inch provides optimum results. The scallops 75 start beyond the curve of the channel 18 at the pommel 80, proximate cut off line 112, and extend to just before the curve of the channel 18 at the cantle 82, proximate cutoff line 110. To more clearly describe the dimensioning of the scallops, FIG. 1 has the scalloped portion of the channel 18 divided into three sections, 102, 104 and 106. Section 106 comprises 75A having a scallop length along the edge of the saddletree of about 0.93 (93/100) to about 0.97 (97/100) of an inch. There are two to three scallops in section 106, depending on the size of the saddle. In Section 104 length of the scallops 75B are longer and flatter, about 1.7 (17/10) to 2.1 (21/10) inches, or approximately double the width, with only one or two scallops in this space. In Section 102, the scallops 75C return to the approximate size as in Section 106. In Sections 108 and 109 the channel 18 edges are unscalloped.

The top surface of the pommel proximal edge 90 of the saddletree 10 has been cut with a recess 92 of approximately 0.25 (¼) to 0.375 (⅜) of an inch from the proximal edge 90, although that can vary by approximately 10%. Preferably the width of the recess 92 is increased around the gullet 94, or high point, of the pommel 80 by approximately ⅛ inch to allow the pommel 80 to flex outward, away from the horse's withers upon the application of pressure. The depth of the recess 92, which is approximately 0.0625 (1/16) inch deep, does not increase along its length, remaining the same no matter what the width. The removal of additional depth will weaken the structural integrity of the saddle. The recess 92 is also used to attach the leather and hardware ultimately placed on the saddle without altering the front profile.

As with all recesses, waves and slots, the flex of the pommel recess 92 must be countered with a material that will limit the flex and return the composite back to its original configuration. In the instance of the pommel 80, which is subject to substantial stress, the bidirectional weave 200 on the underside as well as the carbon fiber strips 246, 248 and cable tie 250 all provide the required support. This support, however, must be balanced with the flex, as taught herein, to achieve the desired results.

Toward the distal end, prior to the curve of the cantle 82, flex slots 16 are cut through the saddletree 10. The flex slots 16, as described in the referenced patents, provide flexibility to the distal portion of the saddle and are described in more detail hereinafter.

The use of wave depressions to create undulations along the outside perimeter of the saddletree provides a novel means to increase comfort for both horse and rider. The wave depressions enable the saddle to lengthen and compress as the horses back moves with each step. The placement, depth and length of the wave depressions are all critical to maintain a balance between strength and flexibility.

Figure 11:
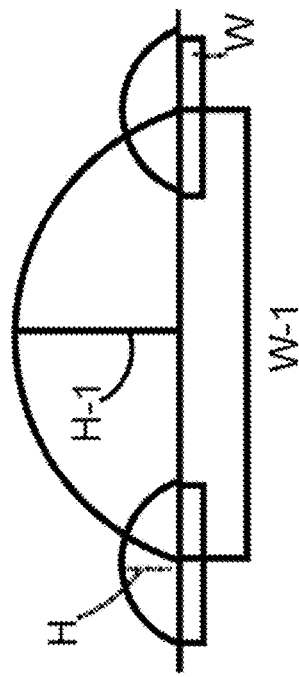
FIG. 11 is a diagram of the height and width of the wave set in accordance with the disclosed invention.
Figure 12:
FIG. 12 is a side view of the wave set of FIG. 14 in accordance with the disclosed invention.

The wave set 70 consists of three wave depressions, two outer depressions, proximal depression 50 and distal depression 52 that are reflected in a concave manner on the top surface of the saddletree 10. A center depression 64 bi-sects a portion of each of the proximal depression 50 and distal depression 52 and is reflected in a convex manner on the top surface of the saddletree. The wave set 70 is illustrated in more detail in FIGS. 11 and 12.

The proximal depression 50 and distal depression 52 are approximately 1 inch high "H" and approximately 1.05 (1 1/20) inches wide "W". The center depression 64 is approximately 2.57 (2⁵³⁄₆₃) inches wide W1 and 2 inches high H1. The depth, or the impression into the saddletree material, is about 0.20 (⅕) for the center depression 64 and 0.07 (³⁄₄₃) for the proximal and distal depressions 50 and 52. The foregoing dimensions are preferred examples based on a 16.5 (16½) inch saddle; however the dimensions can vary by about 50% either way, preferably the dimensions will only range about +/−25% and the most preferably range is about +/−10%. It should be noted however, that if the depressions are too deep, or if the differential between the proximal and distal depressions 50 and 52 and the center depression 64 is too great, the point of differential will become a focal point of pressure.

Figure 10:
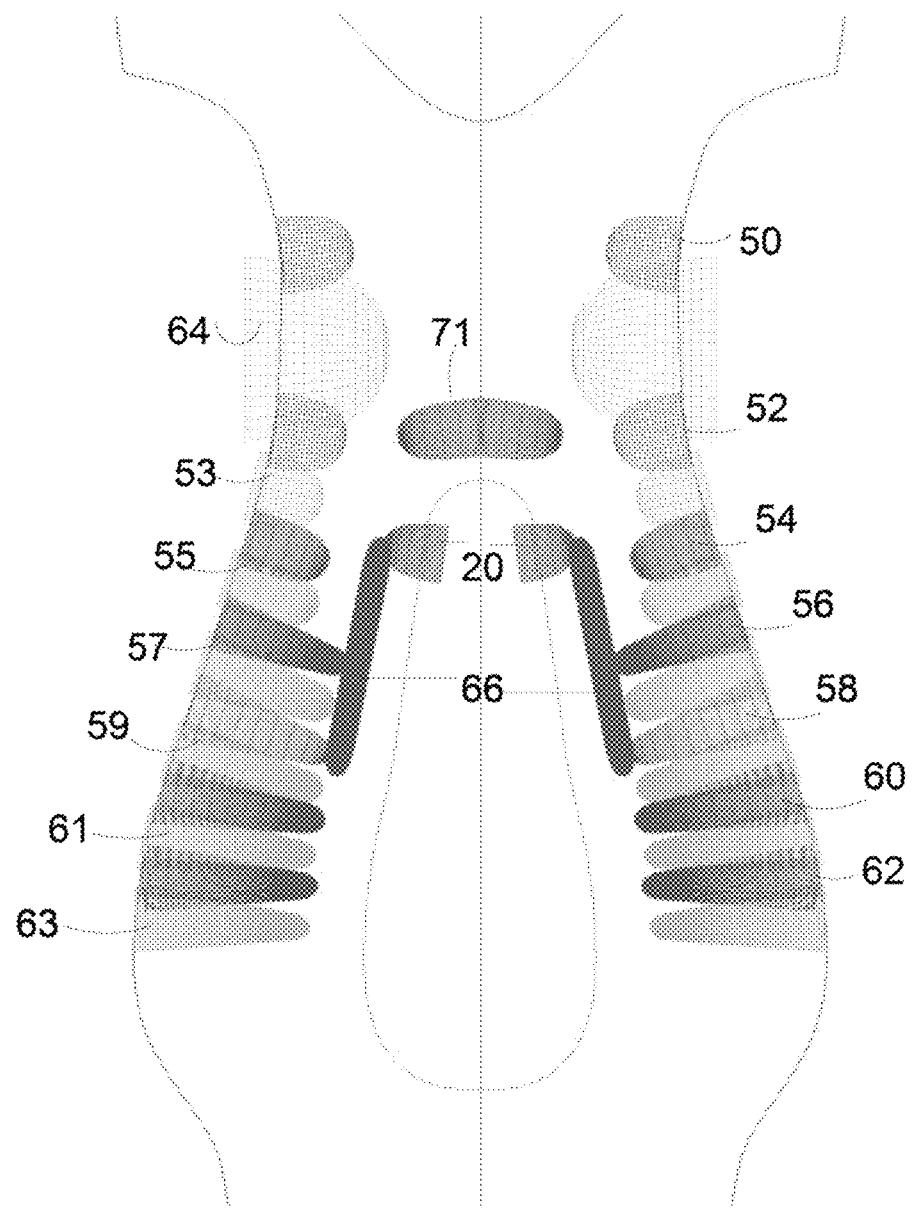
FIG. 10 is a CAD view of the top and bottom waves of the saddletree in accordance with the disclosed invention.

Wave depressions 54, 56, 58, 60 and 62 are molded into the underside 15 of the saddletree 10, and wave depressions 53, 55, 57, 59, and 61, which are off set from depressions 54, 56, 56, 60 and 62, are molded into the top surface 14, as shown in FIGS. 4, 6 and 10. Waves 53 and 54 have a half oval configuration while waves 56-62, and their counterparts 55-61 are cone shaped. The waves are about 0.03 (¹⁄₃₂) of an inch deep and spaced along the edge of each side 12 of the saddletree 10. As illustrated hereinafter, in FIGS. 4 and 6, the offset wave depressions form an undulating affect that contributes to the ability to directionally flex, or stretch, the edges of the saddletree.

The designation of top or bottom waves is for example and the waves can be reversed with the first wave being on the top surface. The critical feature is the placement and dimensioning of the waves.

The depth of the wave depressions 53, 54, 55, 56, 57, 58, 59, 60, 61, and 62 directly affect the performance of the saddletree, or other structure, as the greater the depth, the greater the amount of flex. The wave depression 64 is preferably on the top surface of the saddle with wave 53 to avoid any conflict with the attachment of the stirrup bars. This placement leaves a smooth surface for attachment while not affecting the performance of the wave depressions.

Between the channel 18 and the pommel 80, on the underside of the saddletree 10, is the pommel wave 71. As physics requires that a wave needs an edge to flex, the wave 71 has the ellipse 72 and slots 73a and 73b to provide the necessary edge. The pommel wave 71 enables the torque created by movement of the horse to "move through" the saddle in a controlled manner without resistance or obstruction.

The ellipse 72 and slots 73a and 73b, which are placed within the pommel wave 71 extend through the saddletree 10 while the pommel wave 71 extends into the saddletree 10 as a depression having a depth of 0.03 (¹⁄₃₂), plus or minus 25%. The pommel wave 71 serves to counteract the loss of flexibility encountered when wrapping the pommel 80 with the carbon and enables the material of manufacture to have a controlled amount of flexibility, enabling the pommel to flex with the movement of the horse. The pommel wave 71 is about 0.25 (¼) to 0.5 (½) of an inch from the channel 18 and between 0.5 (½) and 1.55 (1¹¹⁄₂₀) inches long, preferable 0.75 (¾) of an inch, and between 0.25 (¼) and 0.75 (¾) wide, preferably 0.375 (⅜) of an inch wide. The pommel wave 71 should not extend into the wave 64 but rather be spaced slightly therefrom. The ellipse 72 has a height slightly less than that of the of the pommel wave 71, approximately 0.5 (½) to 0.7 (⁷⁄₁₀) of an inches and have a width of about 0.1 (¹⁄₁₀) to about 0.3 (³⁄₁₀) of an inch.

The ellipse 72 within the pommel wave 71 is the keystone to the pommel 80 area having the ability to flex. The pressure required to flex the carbon covered pommel is substantial and would be impossible simply by the movement of a horse's withers without the complete removal of material forming the ellipse 72. The pommel wave 71 removes a slight quantity of material to, in combination with the ellipse 72, enable controlled flex while maintaining structural integrity.

The slots 73a and 73b are proximate the front edge of the pommel wave 71 and at about 24 to 26 degrees from the centerline 22 although their placement from the front edge of the pommel wave 71 can vary up to 40%. The angle from the centerline can range between 16 and 35 degrees, however greater than a 35 degree angle starts to negate the value of the slots 73a and 73b and reduce optimal control. The slots 73a and 73b are 0.0625 (¹⁄₁₆) of an inch wide and 0.375 (⅜) of an inch long although these dimensions can vary slightly. The vertical ellipse 72 is placed further back on the depression with the distal end of the major axis touching the top edge of the pommel wave 71.

In the case of a saddletree 10, too great a depth of the waves or depressions disclosed herein will cause the pressure created by the rider to be focused in a single area rather than the even spread of pressure achieved with the proper depth. In other uses, the depth will directly affect the integrity of the structure, whether it is a bike seat, skateboard, boat hull, etc. as well as the degree of flexibility.

In use with saddletrees, the depth of the wave depressions, top and bottom, would remain the same unless otherwise noted herein. However in some saddle applications, as well as other applications using the wave design to control flexibility, the depth can vary within the saddle or other application.

The placement of the waves with respect to the center line is critical. The back waves 61 and 62 are +/−90 degrees to center to allow the back of the saddle greater flexibility toward the cantle. To prevent over flexing, the wave depressions stop at the point where the cantle starts to curve upward as can be seen easily in FIG. 4, although in some styles, such as Western, the depressions can extend further. On most saddles however, extending the waves beyond the point where the cantle starts to curve will compromise the strength of the saddle.

The waves 55, 56, 57, 58, 59, 60, 61, and 62 are cone shaped in order to leave more material in the center of the saddletree 10 and less material along the edge 12. The cone shaped waves 55-62 have outside angles varying from 90-70 degrees from the centerline 22. In an optimal example waves 53 and 54 are at 76.5 degrees; 55-58 are 71 degrees; 59 and 60 are at 83 degrees; 61 and 62 at 87 degrees, with all angles measured from the centerline 22. Too steep of an angle produces insufficient flex, while too shallow of an angle produces too such flex. The cone shaped waves 55, 56, 57, 58, and 59 have a base width of about 0.625 (⅝) to 1.125 (1⅛) inches and a top width of about 0.5 (½) of an inch. The depth ranges between 0.02 (¹⁄₅₀) and 0.075 (²⁄₂₇) of an inch with a preferred depth in the range of 0.04 (¹⁄₂₅) to 0.05 (¹⁄₂₀) of an inch. If the waves are too deep, the flex is too great, conversely if they are too shallow, the flex is insufficient. The length and depth of the waves will be dependent to some extent on the size and style of the saddle and is more reliant on the distance from the interior edge 42 than the actual length. Waves that are too long, extending into the engineered rail 40, will take away strength while waves that are too short, less than about 0.5 (½) of an inch, will limit flexibility. An average wave would be about 2.5 (2½) inches, in an English saddle, varying somewhat based upon saddle size. It is critical is that the waves do not extend into the engineered rail 40. The base of the waves is perpendicular to the outer edge, although a variation of about 15-20 degrees can be tolerated. This enables the flex to be along the outer edge 12 as the horse moves. The small, inner waves 20 can be parallel with, or close to parallel with, the centerline 22, with a variance of approximately 5 degrees off center. The end line of the inner wave 20 is at the channel section 108.

The purpose of the waves is to provide controlled flexing, more along the outside edge than in the body of the saddletree along the central channel 18. The use of cones enables the control required while preventing over flexing. To accomplish this the cone waves do not extend to the interior edge 42 with the exception of the interior waves 20 which serve to provide a small amount of flex in the pommel area. The interior waves 20 are shallow, between about 0.01 (1/100) and 0.04 (1/25) of an inch and basically a square of between 0.625 (5/8) and 1 inch with the base on the interior edge 42 and the curved top extending into the body of the saddletree.

For skateboards excessive depth would also pinpoint the pressure into a small area causing too much flex under the user's foot and insufficient weight distribution over the remainder of the board affecting control. In bicycle seats excessive depth will cause the seat to fail. In all uses, excessive wave depth will result in structural weakness and excessive movement.

In most embodiments concerning saddletrees, there would be four (4) to six (6) waves on the top surface 14, excluding the wave set 70, with the number of waves and spacing being dependent upon the saddletree size and style. However, the actual number of waves is not as critical as the dimensioning.

The depth of the waves can vary depending upon the size of the saddle. The larger the saddle, the shallower the wave. Therefore an 18 inch saddle would have shallower waves than a 16 inch saddle. The waves are about 0.01 (1/100) of an inch deep and can be as much as about 0.02 (1/50) of an inch deep, depending on saddle size.

Figure 3:
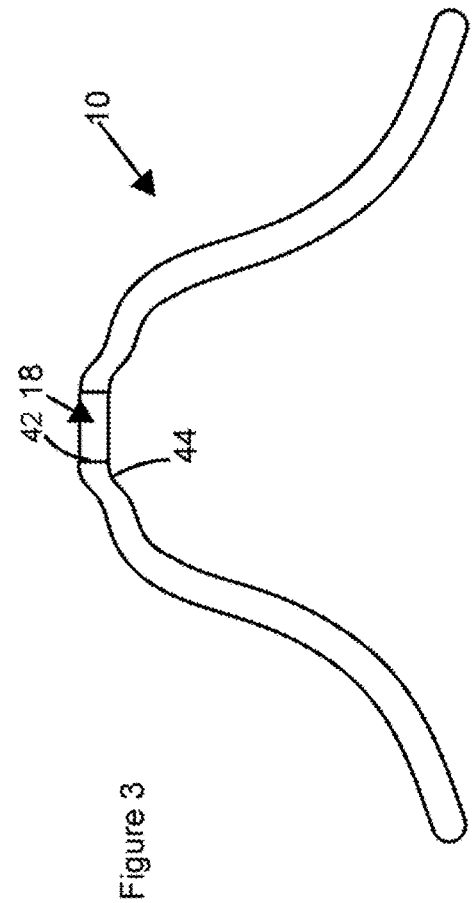
FIG. 3 is a cutaway end view of the front of the saddletree showing the rail in accordance with the disclosed invention.

The saddletree 10 also incorporates an engineered rail design to control flexing. The rail 40 has been designed to control flexing by etching the underside 15 of the saddletree 10, as seen in FIGS. 2 and 3, to provide an engineered rail 40 that extends around the center channel 18 starting and stopping at the small interior waves 20. The rail 40 is formed by undercutting the saddletree 10 along the edge 42 to form a channel, forming a slight "S" curve when viewed from a cutaway of the channel 18 approximate the pommel. The engineered rail is described in more detail in application Ser. No. 12/726,793 which is incorporated herein by reference as though recited in full. Without the design of the engineered rail, the saddle would fold up in the middle under the weight of the rider. It serves as the primary reinforcement and stiffening agent of the x axis and its dimensions can be tuned to optimize the degree of longitudinal bending, or flexing.

As stated heretofore, the rail 40 provides structural strength, while enabling the saddletree to flex. Therefore, it is critical that the underside wave depressions 54, 56, 58, 80 and 62 and top surface wave depressions 53, 55, 57, 59 and 61 do not extend into the channel 44 of the rail 40 and compromise structural integrity.

A secondary rail 66, approximately parallel to the engineered rail 40, supports the engineered rail 40 to prevent excessive bending. As stated, the wave depressions 53, 55, 57, 59 and 61 increase the flex of the saddletree 10 along the edge 12, permitting an advantageous flex, or stretching, during the natural side to side sway of a horse's gate as well as during turns. However, excessive flex along the middle of the saddletree, which contacts the horse's back, causes rubbing and discomfort. The secondary rail 66, while permitting flex on the outer edge, prevents the saddletree from flexing into the horse's back. The location of the secondary rail 66 is at the point of rider weight concentration, placing the extra strength at the point of least desirable flex. The secondary rail 66 is placed parallel to the engineered rail 40 approximately 0.25 (1/4) of an inch from the engineered rail 40. The secondary rail 66 is approximately 0.375 (3/8) of an inch wide, although width and distance from the engineered rail 40 can vary depending on saddle size. The secondary rail 66 can be etched or formed into the saddletree 10 in any manner convenient for the manufacture.

One of the critical features in obtaining the controlled flex is the wave depressions and their design and spacing. A side view of the saddletree 10 is illustrated in FIG. 4 showing the underside wave depressions 54, 56, 53.60 and 62 and top side wave depressions 53, 55, 57, 59 and 61.

The sequencing and configuration of the waves is critical to obtaining optimal performance. Although some percent of change can be made with advantages over prior art saddles being retained, the greater the variation from the dimensions taught herein, the greater the reduction in performance.

In order to expand and contract optimally without losing strength, the waves 55, 56, 57, 58, 59, 60, 61 and 62 are cone shaped. This, as stated heretofore, leaves maximum material toward the center while providing needed flex along the edges. If the waves 55, 56, 57, 58, 59, 60, 61 and 62 did not have a cone configuration but were shaped the same as waves 20, a massive amount of material would be removed from the saddletree and the integrity would be severely compromised. If the waves were shortened to retain material, the flex, or compression/expansion, would be compromised. As stated herein, the waves rust not extend into the engineered rail 40 as that would compromise the strength of the saddletree.

The waves 53 and 54 do not extend as far as the cone waves as they are located in a prime pressure area and do not have the reinforcement of either the engineered rail 40 or the secondary rail 66.

In addition to producing controlled flexing aloe the body of the saddletree, the wave pattern provides the elasticity required to enable the saddletree to flex from cantle to pommel. When a horse moves in any gait, as well as turns, the spine curves. Prior art saddletrees have remained straight, with the padding the only means to protect the horse's back. Using the waves disclosed herein, the saddle itself will compress and stretch during movement and turns as illustrated in FIG. 6 and described further hereinafter.

In FIG. 5A the single sheet of carbon fiber 200 has been added to the underside of the saddletree 10. As seen, the carbon fiber 200 extends up to the cantle as well as covers the rail 40 and secondary rail 66. By continuing the single sheet of carbon fiber 200 to cover the cantle, the strength added by the carbon fiber 200 is concentrated in all of the areas of the saddletree 10 that are subject to the stress caused by the rider's weight. The carbon fiber 200 is placed with the warp and fill angled at about 45 degrees, plus or minus 10%, to square, or to the axis of the centerline down the saddletree, with the greater the angle, the greater the flexibility. The ability to vary the angle, and thereby affect the flexibility of the saddletree, provides another method with which to provide controlled directional flexibility.

As seen in FIG. 5B, illustrating the top surface of the saddletree 10, the carbon fiber 200 extends around the edges 12 and up onto the top surface of the saddletree 10. Without the carbon fiber 200 brought up to the top surface of the saddletree 10, the composite has uncontrolled stretch and can, with use, stretch beyond its capacity to return to its original configuration. The wrapping of the carbon fiber 200 allows a controlled stretch, enabling the saddletree 10 to return to its original configuration. The carbon fiber is brought up to the top surface of the saddletree 10 approximately 0.375 (3/8) of an inch in order to provide secure purchase onto the saddletree 10, as well as prevent stretch along the sides 12 of the saddletree 10. Around the outside of the saddletree 10, the carbon fiber 200 extends from a distal edge of the points 228 to just above the wave 60. By leaving the last wave 62 without the overlap, the cantle 82 can flex as needed. This can also be described as extending up to and in line with the third section 104 of the center channel 18. In the channel 18, the carbon fiber 200 extends along the channel edges to the top surface of the saddletree 10, ending flush with the top surface of the saddletree 10 without wrapping over the to surface. Wrapping the carbon fiber over the top of the saddletree 10 at the channel 18 stiffens the saddletree 10 more than is advantageous by prevent flexing along, the horse's spine. Bringing the carbon fiber up to covered the edges of the central channel 18 returns the scallops 75A, 75B and 75C to their original position when flexing with the horse's movement.

In this figure, in addition to waves 50-62, slots 73a and 73b and ellipse 72, the pommel reinforcement receiving holes 247A and 247B have been drilled.

FIG. 6 is a side view of the change in the wave depressions as the saddletree 10 flexes, or lengthens, during normal movement of a horse's gait. The lower wave depressions 54, 56, 58, 60, and 62 and their corresponding wave depressions 53, 55, 57, 59, and 61 are depicted in broken lines showing the wave depressions when the saddle is squared up. The solid lines illustrate lower wave depressions 154, 156, 158, 160, and 162 and their corresponding wave depressions 153, 155, 157, 159 and 161 in a more flattened state as would occur during movement. During a turn, the waves would flatten further. The flexing of the sides 12 of the saddletree 10 as the horse moves keeps the weight balanced and prevents any portion of the saddle from coming in unyielding contact with the horse's body.

The placement of the axis at 45 degrees from the centerline unlocks the axis of rotation to enable rotation in more directions. The carbon weave has the least amount of give along the bias and therefore "locking" the saddletree between parallel bias prevents movement in that direction. However, by offsetting the bias, controlled rotation, or movement, is enabled in all directions. In this manner the exact angle between carbon fiber weave and primary x axis allows for fine tuning of the saddletrees flexion and performance. The above configuration is preferred for optimal results for the majority of the horses and riders.

Figures 7, 8:
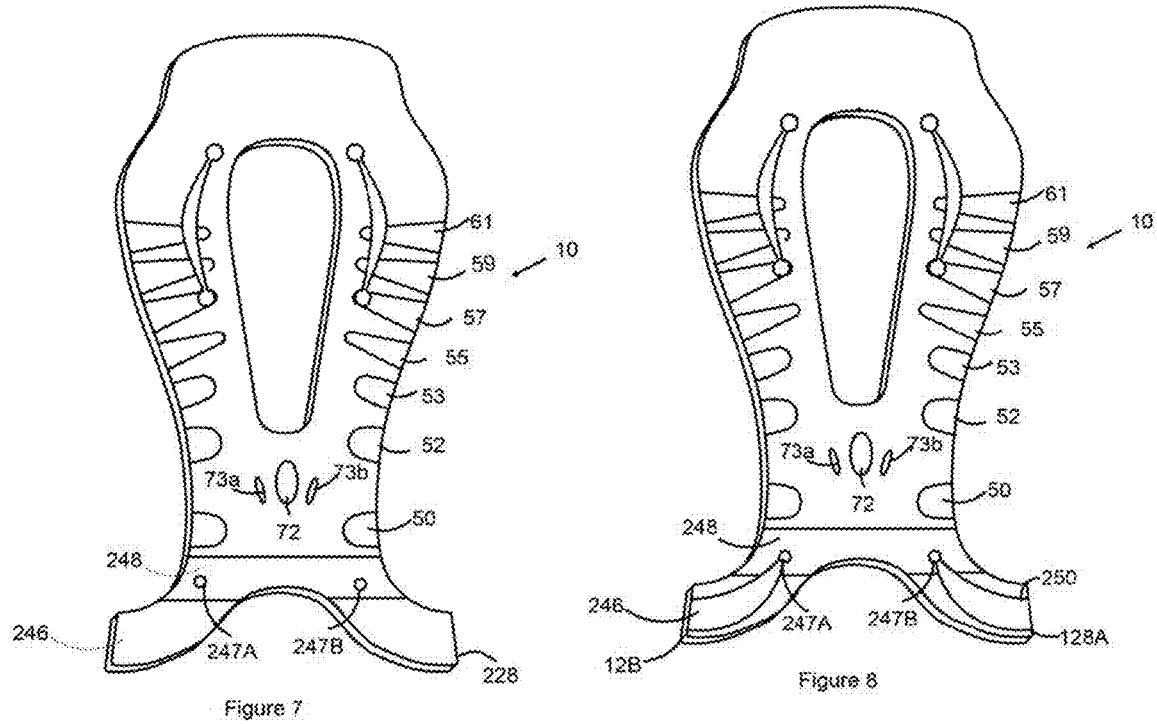
FIG. 7 is a top view of the top of the saddletree having carbon pommel strips applied in accordance with the disclosed invention.
FIG. 8 is a view of the top of the saddle having the cable tie unidirectional carbon strip placed over the pommel strips in accordance with the disclosed invention.

As the pommel 80 is one of the greater stress points, to provide the required reinforcement, unidirectional carbon strips 246 and 248, as illustrated in FIGS. 7 and 8, are placed over the pommel 80 on both the upper and lower surfaces (upper service illustrated). The proximal strip 246 extends to the ends of the points 228 while, the distal strip 248 is placed directly behind and adjacent to, or proximate, the proximal strip 246.

Figure 9:
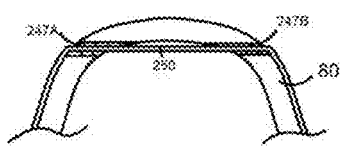
FIG. 9 is a top view of the saddletree illustrating the carbon placement over the pommel area.

In FIGS. 8 and 9, a carbon cable strip 250 has been threaded from a first point 128A, into the receiving hole 247B, under the pommel 80, out at the receiving hole 247A and ends at the second point 128B.

As seen in greater detail in FIG. 9, the mid portion of the carbon strip 250 lies on the underside of the pommel 80, acting as the equivalent of cable ties on a suspension bridge. The receiving holes 247A and 247B pass through the pommels 80 curved underside at a point to permit the carbon strip 250 to lie adjacent to the underside of the pommel 80. It should be noted that although the carbon strip 250 appears to be spaced from the underside of the pommel 80 that is for easier visualization and the strip 250 is actually in contact with the surface of the underside of the pommel 80. The carbon strip 250, extends down, along the pommel to the edge of the saddletree as illustrated. Although the carbon strip 250 appears to be spaced from the pommel 80 in FIG. 13, this is for illustration purposes only and the strip is adhered to the sides of the pommel. The use of the carbon strip 250 reinforces further the pommel 80 to prevent the spreading that is, in the prior art, prevented with a metal gullet. The receiving holes 249A and 249B are preferably drilled after the application of the carbon fiber covering that area, however they can be drilled prior to carbon fiber application if this fits with the manufacturing process.

If the receiving hole 247A, 247B, are placed too high on the pommel 80, they will weaken the structure, while too low on the pommel 80 and the necessary clearance for the horse's withers is lost. By drilling the receiving holes 247A, 247B, parallel to the top of the pommel 208, at a point where the top of the receiving hole is proximate to the underside of the pommel 80, the receiving holes 247A, 247B, will automatically be positioned to correctly place the mid portion of the carbon strip 250. Although a single carbon cable strip is illustrated, it should be noted that additional carbon cable strips can be used. The width of the carbon strip 258 is about 1.5 (1½) inches wide, although as noted heretofore other sizes can be used, regardless of saddle size.

FIG. 10 illustrates how the waves overlap one another and how they are positioned with respect to the inner rail 66, waves 20 and waves 73a and 73b. As can be seen from this figure, there is an overlap between the top and bottom waves as they undulate. As noted heretofore, the waves, or undulation, enables the saddletree to stretch and subsequently return to its normal position.

Figure 14:
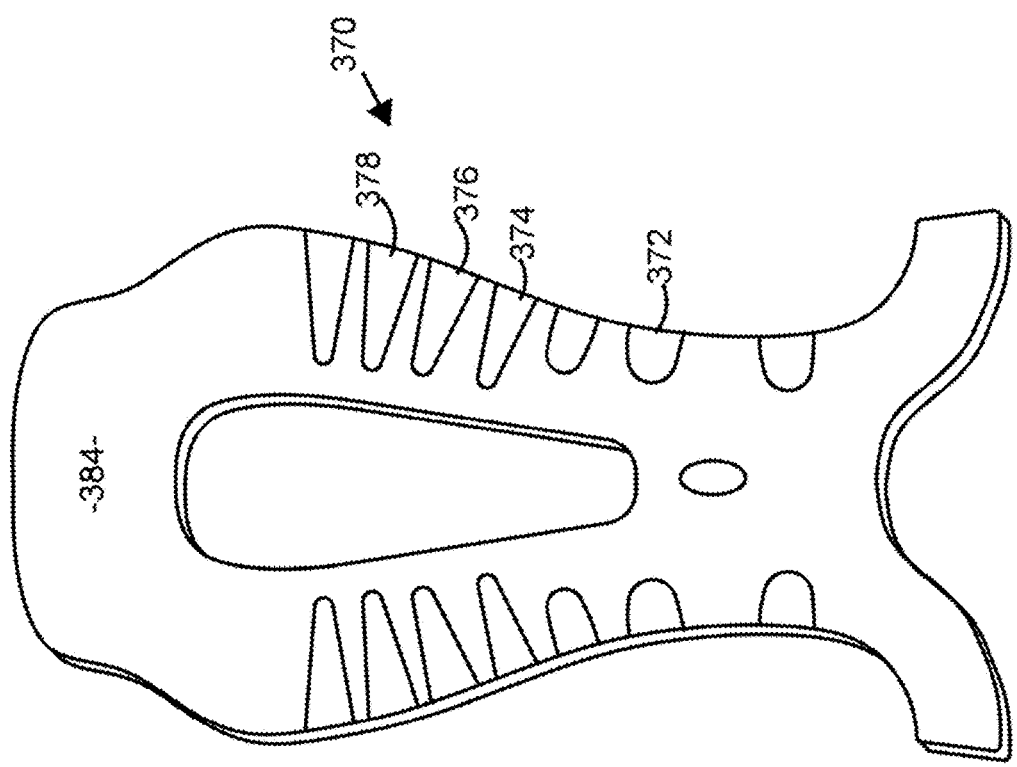
FIG. 14 is a top view of the top of an alternate saddletree with the slots removed in accordance with the disclosed invention.

In the embodiment illustrated in FIG. 14, the slots 16 of FIGS. 1 and 2 have been removed from the saddletree 370 with the wave depressions 372, 374, 376 and 378 providing the flex. Although only the top surface 384 of the saddletree 370 is shown, the underside of the saddletree 370 is as described heretofore.

As a point of reference, the following are approximate example dimensions to produce optimum performance and comfort for both horse and rider. These dimensions are provided as examples only and can be varied and altered as will be evident to those skilled in the art when practicing the teachings herein. As previously noted, the dimensions can vary by about +/−50%; preferably the dimension range can be about +/−25% and most preferably about +/−10%.

Figure 13:
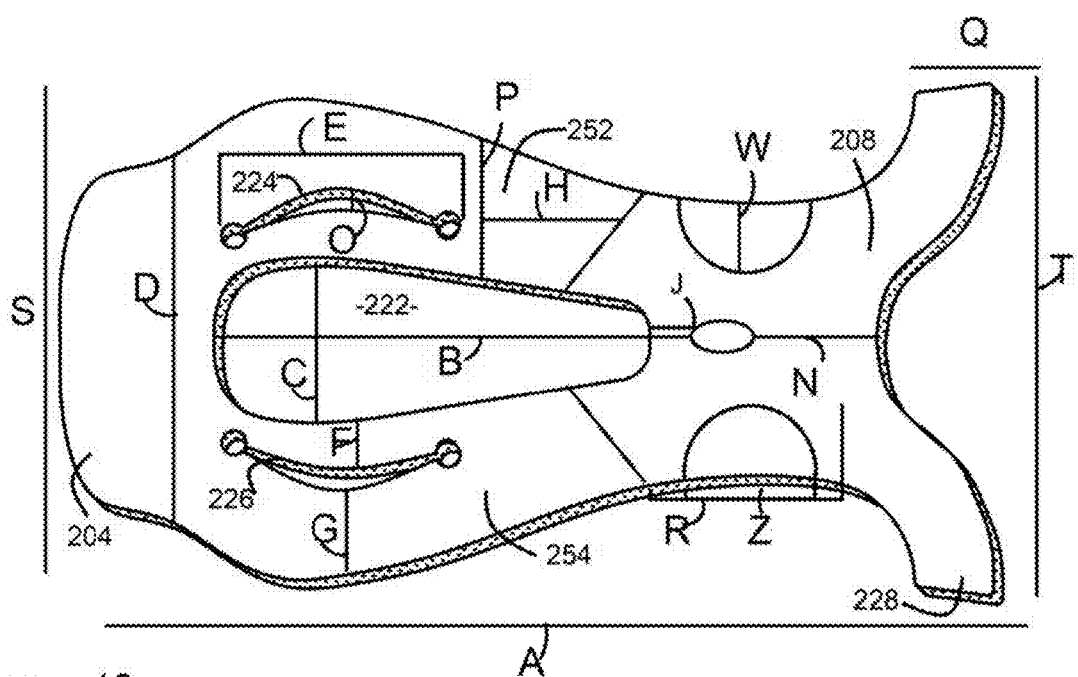
FIG. 13 is a top view of the saddle showing dimensions in accordance with the disclosed invention.

As seen in FIG. 13 the distance "A" between the points 128 and the cantle 204 is 15.193 (15 6/31) inches, which measures out to what is referred to as a 17.5 (17½) inch saddle. The cantle width "D" is 6.740 (6 20/27) inches. The width between points 228, indicated by "T" is 9.5 (9½) inches. The channel 222, from the cantle 204 to the start of the pommel 208, "B" is 9.969 (9 31/32) inches. At the widest point "C" the channel 222 is 3.276 (3 8/29) inches and the side bars 252 and 254 on either side of the channel 222 have a width of 4.769 (4 10/13) inches at the point indicated by "P". At the widest point, from edge to edge of the saddletree and indicated by the saddletree is 12.524 (12 11/21) inches, which is the total of the side bars 252 and 254 (G, O, and F) plus the channel 222 width "C". The distance "N" between the distal end, of the pommel 205 to the proximal end of the pommel 208 is 3.514 (3 18/35) inches. The flex slots 224 and 226 length "E" is 6.51 (6 25/49) inches with "G", the outer edge to saddletree edge 206, being 1.665 (1 133/200) inches and "F" the inner edge to the channel 222 being 1 inch. The flex slots 224 and 226 are at the widest point "O" 0.466 (7/15) of an inch. The distance "H" between the end of the flex slots 224 and 226 and the beginning of the bi-directional weave 240 is 0.719 (23/32) of an inch. The distance between the channel 222 and the ellipse 72 "J" is 0.25 (1/4) of an inch. The points 228 have a width "Q" of 1.839 (126/31) inches. The underside of the saddletree is not shown as the carbon fiber extends over the entire surface and the remaining dimensions remain the same as the top of the saddletree.

The saddletree is subjected to numerous static and dynamic loads along the y axis. The static loads include the weight of the rider as transmitted through the riders seat, the downward pressure exerted by the girth that secures the saddle, and the y component of the force generated via the stirrup bars. The dynamic loads include the weighing and un-weighing of the rider, the g-forces generated during jumping and landing, the pressure originating with the expansion and contraction of the horse's chest, and the concave and convex bending of the horse's spine. The saddletree must accommodate these forces without undue distortion. However, it is imperative that the saddletree maintain its flexibility and abilities to allow freedom of movement of the horse. The y component of these forces is addressed primarily via two engineered features of the saddletree. Directly under and forward of the rider the saddletree has two extended arches (one on each side of the x axis) that add to the structural integrity of the saddletree while also maintaining flexibility. The extended arches are phased out as one moves rearward towards the cantle with engineered rails now mitigating the various forces.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

What is claimed is:

1. An equine saddletree with controlled flexing having:
   a body, said body comprising:
      a top surface,
      an underside,
      a cantle,
      a pommel, said pommel having a gullet and a pair of points, said gullet and said pair of points having a proximal edge and said pair of points having a distal edge;
      a center channel, said center channel having a peripheral edge;
      a pair of opposing sidebars between said cantle and said pommel, said sidebars having sidebar peripheral edges; and
      multiple sets of offset wave depressions, each of said sets having a predetermined number of depressions along each of said sidebar peripheral edges from proximate said pair of points toward said cantle, each of said wave depressions having a counterpart on an opposing side of said saddletree to form undulations between said top surface and said underside to enable limited stretch along said sidebar edges.

2. The saddletree of claim 1 wherein a first of said sets is proximate said pair of points, each of said first of said sets comprising a central wave, a proximal wave and an opposing distal wave with respect to each of said pair of points.

3. The saddletree of claim 2 wherein said proximal wave is a depression in said top surface, said central wave a depression in said underside and said distal wave a depression in said top surface.

4. The saddletree of claim 1 wherein a second of said sets is a half oval.

5. The saddletree of claim 1 wherein a third of said sets is a cone.

6. The saddletree of claim 1 wherein said center channel is divided into five sections, a first section being proximate said pommel and having a smooth edge, a second section, a third section and a fourth section having scallops along said edge and a fifth section having a smooth edge.

7. The saddletree of claim 6 wherein said scallops in said third section have a greater length and less depth than said scallops in said second section and said fourth section.

8. The saddletree of claim 1 further comprising a pair of single inner waves, said inner waves having a half oval configuration and located on said underside with an end line at said center channel proximate said first of said predetermined number of depressions.

9. The saddletree of claim 1 further comprising a pommel wave, said pommel wave being a pair of half ovals with adjacent end lines and located on said underside proximate said pommel.

10. The saddletree of claim 9 wherein the pommel wave further comprises an ellipse, said ellipse extending from said top surface to said underside and centered on said centerline within said pommel wave.

11. The saddletree of claim 10 wherein said pommel wave further comprises slots on each side of said ellipse, said slots extending from said top surface to said underside and angled from said centerline.

12. The saddletree of claim 10 further comprising slots, said slots being on each side of said ellipse, extending from said top surface to said underside and angled from said centerline.

13. The saddletree of claim 1 wherein said center channel is divided into five sections, a first section being proximate said pommel and having a smooth edge, a second section, a third section and a fourth section having scallops along said edge and a fifth section having a smooth edge and further comprising an engineered rail, said engineered rail etched into said underside at said peripheral edge of said center channel at said section two, said section three, said section four and said section five.

14. The saddletree of claim 13 further comprising a secondary rail said secondary rail being spaced from said center channel and etched in at least a portion of said section two and said section three of said underside.

15. The saddletree of claim 1 further comprising a secondary rail, said secondary rail etched into said underside approximately parallel to and spaced from said center channel.

16. The saddletree of claim 1 wherein said underside is covered with bidirectional carbon weave member.

17. The saddletree of claim 16 wherein said bidirectional carbon weave is placed 45 degrees, plus or minus 10%, from a centerline of said saddletree.

18. The saddletree of claim 16 wherein said bidirectional weave extends from said underside to said top surface along said distal edge of said points and said sidebar edges to a first section, a second section and a third section to form an overlap on said top surface.

19. The saddletree of claim 18 wherein said overlap is about ⅜ of an inch.

20. The saddletree of claim 16 wherein said bidirectional weave extends from said underside along said peripheral edge of said center channel flush with said top surface.

21. The saddletree of claim 20 further comprising receiving holes on either side of said pommel to receive a carbon strip from the top surface through a first of said receiving holes, along said underside of said pommel, through a second of said receiving holes to said top surface of said pommel.

22. The saddletree of claim 1 further comprising carbon strips covering said top surface at said pommel and said underside of said pommel.

23. The saddletree of claim 1 further comprising a recess formed in said proximal edge of said pommel, said recess having a width and a length.

24. The saddletree of claim 23 wherein said width of said recess is greater at said proximal edge of said gullet than at said proximal edge of said points.

25. An equine saddletree with controlled flexing having:
   a body, said body comprising:
      a saddle distal edge,
      a cantle at said saddle distal edge,
      a saddle proximal edge,
      a pommel at said saddle proximal edge, said pommel having a gullet and points,
      a center channel, said center channel having a peripheral edge, said center channel divided into five sections, a first section being proximate said pommel and having a smooth edge, a second section having a first set of scallops, a third section having a second set of scallops and a fourth section having a third set of scallops along said peripheral edge and a fifth section having a smooth edge, said second set of scallops in said third section having a greater length and less depth than said first set of scallops in said second section and said third set of scallops said fourth section;
   a pair of opposing sidebars, said sidebars having sidebar edges between said cantle and said pommel;
   a top surface;
   an underside, said underside covered with bidirectional carbon weave at a 45 degree angle, plus or minus 10%, from a centerline of said saddletree, said bidirectional weave extends from said underside to said top surface along said distal edge of said points and said sidebar edges along first section, said second section and said third section to form an overlap on said top surface of about ⅜ inch, and extending from said underside along said peripheral edge of said center channel flush with said top surface;
   said gullet and said points having a proximal edge and said points having a distal edge, a carbon strip covering said top surface of said pommel and said underside at said pommel and;
   receiving holes on either side of said gullet to receive a second carbon strip from the top surface of a first of said points through a first of said receiving holes, along said underside of said gullet, through a second of said receiving holes to said top surface of a second of said points;
   multiple sets of offset wave depressions, each of said sets having a predetermined number of wave depressions along each of said sidebar edges from proximate said pommel toward said cantle, each of said wave depressions having a counterpart on an opposing side of said saddletree to form undulations between said top surface and said underside to enable limited stretch along said sidebar edges;
   a first of said sets s proximate said points, each of a first of said sets comprising a central wave, a proximal wave and opposing distal wave with respect to each of said points, said proximal wave a depression from said top surface, said central wave a depression from said underside and said distal wave a depression from said top surface;
   a second of said sets are half ovals;
   a third of said sets are cones;
   a pair of single inner waves, said inner waves having a half oval configuration and located on said underside with an end line at said center channel proximate said first of said sets;
   a pommel wave, said pommel wave having an ellipse, said ellipse extending from said top surface to said underside and centered on said centerline within said pommel wave and slots on either side of said ellipse, said slots extending from said top surface to said underside and angled from said centerline;
   an engineered rail, said engineered rail etched into said underside at said peripheral edge of said center channel at said section two, said section three, said section four and said section five;
   a secondary rail, said secondary rail etched into said underside approximately parallel to and spaced from said center channel, said secondary rail etched in at least a portion of said section two and said section three of said underside;
   a recess cut in said proximal edge of said pommel, said recess having a width and a length, said width of said recess being greater at said proximal edge of said gullet than at said proximal edge of said points.

\* \* \* \* \*